United States Patent Office 3,554,047
Patented Jan. 12, 1971

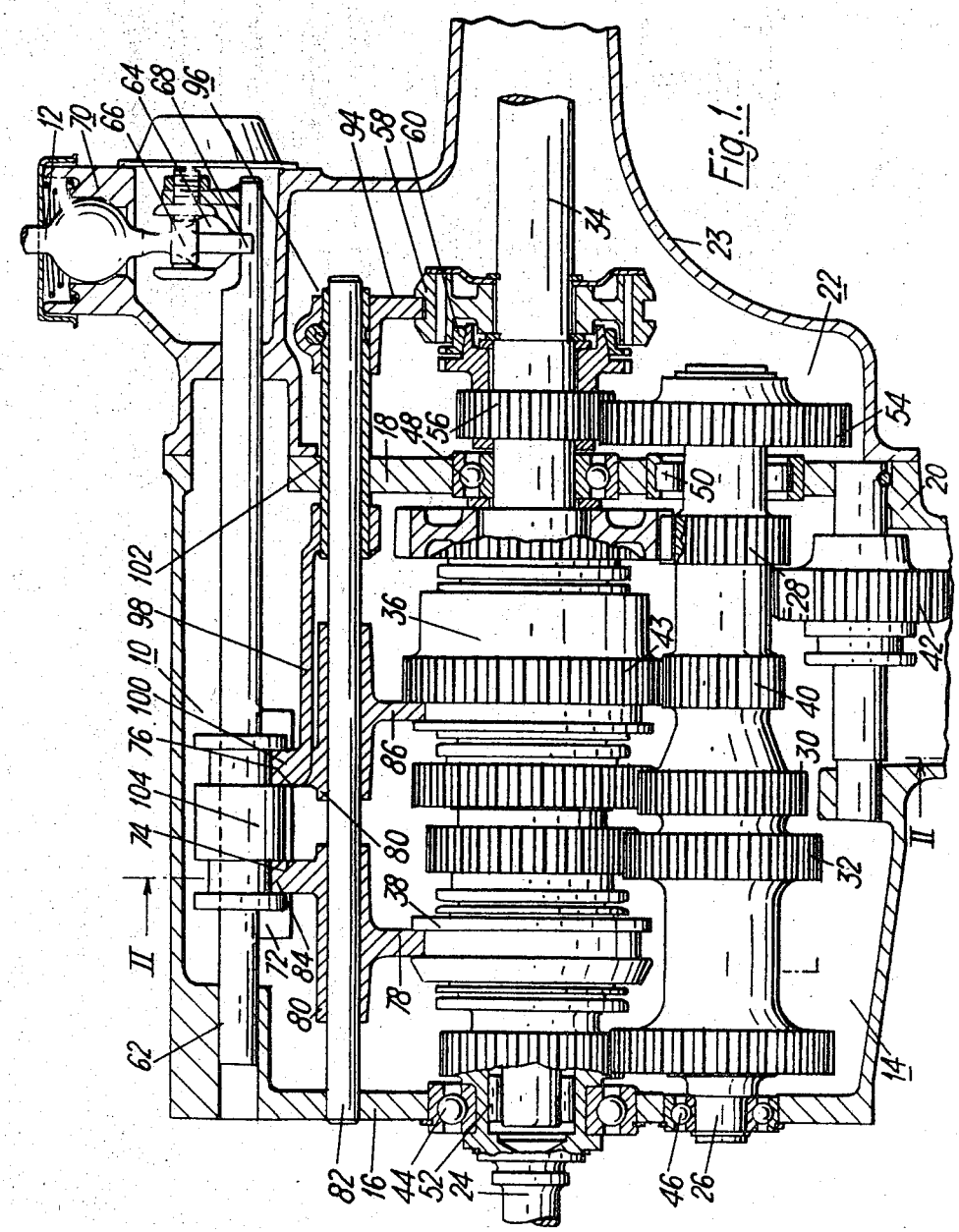

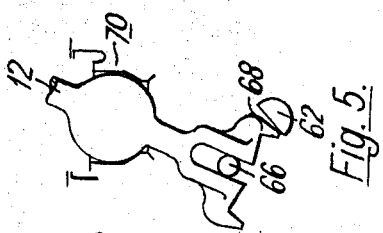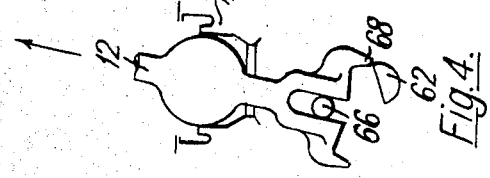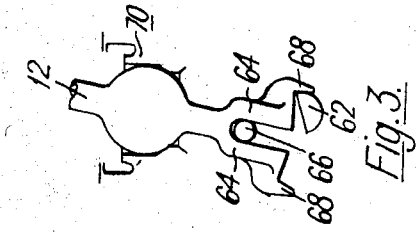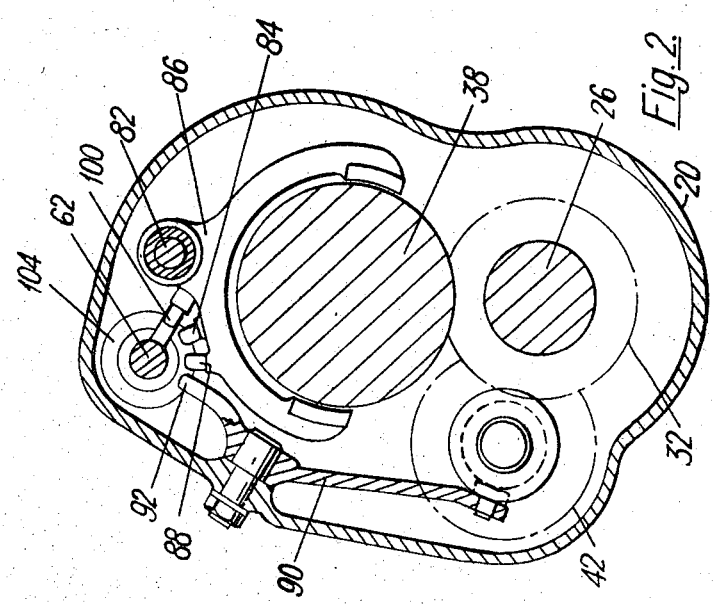

3,554,047
SELECTOR MECHANISMS FOR CHANGE-SPEED
GEARS
Thomas Charles Felix Stott, Harpenden, England, assignor to General Motors Corporation, Detroit, Mich., a corporation of Delaware
Filed Mar. 5, 1969, Ser. No. 804,447
Claims priority, application Great Britain, Mar. 18, 1968, 12,846/68
Int. Cl. G05g 5/10
U.S. Cl. 74—477                                   5 Claims

ABSTRACT OF THE DISCLOSURE

A selector mechanism for a change-speed gear, primarily for use in motor vehicles, includes selectively movable striker forks, or other striker members, which are slidably mounted on a striker shaft that is mounted at one end in a first wall of the gear housing. The striker members co-operate with clutch coupling sleeves or other coupling members of the change-speed gear. One of the coupling members, for an auxiliary gearset which may for instance be arranged to give an overdrive ratio, is disposed on the side of a second wall of the gear housing remote from the other coupling members: the striker member for the coupling member of the auxiliary gearset has a tubular boss portion which extends through, and is slidable in, an aperture in the second wall so as to form a mounting support for the striker shaft relative to the second wall.

With this arrangement, also, selector portions of the various striker members may be grouped closely together, for example in two or possibly only one common radical-plane regions, to facilitate selection by a single selector shaft, possibly with an associated interlock member.

---

This invention relates to selector mechanisms for change-speed gears, for example for use in motor vehicles.

The invention is concerned with selector mechanisms having selectively movable striker forks or other striker members for effecting selective movement of coupling members of the change-speed gear, for selective engagement of gear ratios.

According to the invention, from one aspect, in a selector mechanism for a change-speed gear: striker members are arranged to be selectively movable for effecting movement of respective coupling members of a change-speed gear; the striker members are slidably mounted on a shaft which is mounted at one end in a first wall of a housing for the change-speed gear; one of the coupling members is disposed beyond a second wall of the housing; and, for effecting movement of the said one of the coupling members, the striker member for this coupling member includes a hollow boss portion by means of which the coupling member is slidably mounted on the shaft and the said hollow boss portion extends through, and is slidable in, an aperture in the second wall of the housing, such that the hollow boss portion forms a mounting support for the shaft with respect to the second wall of the housing.

According to the invention, from another aspect, in a selector mechanism for a change-speed gear:

a selector shaft is mounted in a housing for rotary movement about the longitudinal axis of the selector shaft and for movement in the longitudinal direction of the selector shaft;

a plurality of striker members are slidably mounted on a striker shaft which is mounted at one end in a first wall of the housing and extends parallel to the selector shaft;

the striker members co-operate with respective coupling members for the change-speed gear;

the selector shaft includes at least one selector portion, and each of the striker members includes a respective selector portion, in an arrangement in which rotary movement of the selector shaft allows alignment of a selector portion of the selector shaft with the selector portion of any selected one of the striker members, and subsequent longitudinal movement of the selector shaft moves the selected striker member longitudinally with the respective selector portions in engagement; and, one of the coupling members is disposed beyond a second wall of the housing; and, for effecting movement of the said one of the coupling members, the striker member for this coupling member includes a hollow boss portion by means of which the coupling member is slidably mounted on the shaft, and the said hollow boss portion extends through, and is slidable in, an aperture in the second wall of the housing, such that the hollow boss portion forms a mounting support for the shaft with respect to the second wall of the housing.

The selector portion, or each selector portion, of the selector shaft may comprise a pair of longitudinally spaced shoulders forming a pair of abutment surfaces which face in opposite longitudinal directions. If the two abutment surfaces face together, they form a recess; if they face apart, they form the end faces of a projection. Thus, for example, the selector portion, or each selector portion, of the selector shaft may be a recess, and the selector portion of each of the striker members may be a corresponding projection.

The selector mechanism may also include an interlock member which is constrained from moving in the longitudinal direction of the selector shaft and includes blocker portions arranged to prevent longitudinal movement of the striker members other than the selected one. The interlock member may be rotatably mounted on the selector shaft, and be constrained from moving in the longitudinal direction of the selector shaft by engagement with a pin or other projection extending from the housing; alternatively, the interlock member may have its mounting directly to the housing.

The coupling member which is disposed beyond the second wall of the housing may control engagement of a gearset for driving a main shaft of the change-speed gear mechanism at an uppermost gear ratio, for example an overdrive gear ratio. For example, a driver gearwheel rotatable with a layshaft of the change-speed gear mechanism may be in constant mesh with an overdrive-ratio driven gearwheel rotatably mounted on the main shaft, and the said coupling member may cooperate with a slidable clutch coupling sleeve for selectively connecting the overdrive-ratio driven gearwheel to the main shaft.

The other coupling members may control engagement of associated gearsets disposed between the first and second walls of the housing, for example constant-mesh gearsets for establishing first to fourth forward ratios, as well as a sliding-mesh gearset for establishing a reverse ratio.

The selector portions of the striker members may be spaced circumferentially round the selector shaft and may be disposed in a single radial-plane region of the selector shaft or in more than one such region, according to whether the selector shaft has a single selector portion or more than one selector portion.

For producing the rotary and longitudinal movements of the selector shaft, a gearshift lever may have a stirrup-joint connection to the selector shaft, and this connection may include a double baulking arrangement for preventing inadvertent selection of two outermost ones of the rotary positions of the selector shaft, for example for preventing inadvertent selection of a first rotary end position of the selector shaft corresponding to a reverse ratio, and also of a second rotary end position of the selector shaft corresponding to an over-drive ratio. For this purpose a lower end portion of the gearshift lever may be formed with a pair of legs straddling a crank pin fixed by way of a crank arm to one end of the selector shaft, and either the legs themselves or outwardly offset extensions of the legs may be engageable with the selector shaft to baulk rotary movement of the selector shaft into the two outermost positions, with the gearshift lever being so mounted, as by means of a spring-loaded ball mounting, as to allow the gearshift lever to be moved axially, for example lifted, into a position in which the arc of movement of the legs or baulking extensions thereof is clear of the selector shaft.

The invention also comprehends a motor vehicle having an engine arranged to drive a pair of wheels of the vehicle by way of a change-speed gear having coupling members which, for selective engagement of gear ratios, are selectively movable by a selector mechanism as aforesaid.

The appended claims define the scope of the invention claimed. The invention and how it can be performed are hereinafter particularly described with reference to the accompanying drawings, in which:

FIG. 1 is a longitudinal section of one embodiment of a selector mechanism according to the invention, together with associated parts of a change-speed gear for driving a transverse pair of wheels of a motor vehicle;

FIG. 2 is a somewhat schematic fragmentary cross-section on the line II—II of FIG. 1, in the direction of the arrows;

FIGS. 3, 4 and 5 are somewhat schematic fragmentary local cross-sections of a gearshift lever shown in FIG. 1, and illustrate a baulking arrangement in three different positions.

In the embodiment of a selector mechanism according to the invention which is shown in the drawings, as is best seen in FIG. 1 the selector mechanism 10, under the control of a gearshift lever 12, is arranged for selective establishment of gear ratios in a change-speed gear which comprises a four-forward ratio and reverse portion 14 disposed between first and second walls 16 and 18 respectively of a gear housing 20, and an overdrie (fifth) ratio portion 22 disposed beyond the second wall 18, that is, on the side of the wall 18 remote from the wall 16 in a (rear) cover portion 23 forming an output-end portion of the gear housing 20.

The four-forward ratio and reverse portion 14 of the change-speed gear is of a conventional construction in which an input shaft 24, connected to be driven by a motor vehicle engine (not shown), drives a lay-shaft 26 by way of intermeshing reduction-drive head gears, the layshaft having fixed thereto first, second and third-ratio pinions 28, 30 and 32 respectively which are in constant mesh with corresponding gearwheels that are rotatably mounted on a main shaft 34 of the change-speed gear but can be selectively connected to the main shaft by means of coupling members in the form of conventional double-acting slidable clutch coupling sleeves, namely a coupling sleeve 36 for first and second ratios and a coupling sleeve 38 for third and fourth ratios, this fourth ratio being a direct drive obtained by coupling the main shaft direct to the head gear pinion which is rotatable with the input shaft 24. The layshaft also has fixed thereto a pinion 40 which is engageable by a reverse-ratio coupling member in the form of a conventional sliding-mesh idler gearwheel 42, for driving the main shaft 34 at a reverse ratio through a reverse gearwheel 43 fixedly mounted on the coupling sleeve 36, which is mounted in conventional manner on longitudinal splines of the main shaft. The main shaft 34 is connected to drive a transverse pair of driven wheels (not shown) of the motor vehicle.

Ball-bearings 44 and 46 are mounted in the first wall 16 of the gear housing 20 for rotatably supporting, respectively, the input shaft 24 and the layshaft 26. A ball-bearing 48 and a roller bearing 50 are mounted in the second wall 18 of the gear housing 20 for rotatably supporting, respectively, the main shaft 34 and the layshaft 26. There is also a needle roller bearing 52 which rotatably supports one end of the main shaft 34 in a hollow end portion of the input shaft 24 in the region of the ball-bearing 44.

The overdrive (fifth)-ratio portion 22 of the change-speed gear comprises a driver gear 54 carried by, and fixed by splines to, a portion of the layshaft beyond the second wall 18, that is, on the side of the second wall 18 of the gear housing 20 remote from the first wall 16; the driver gear 54 is in constant mesh with a driven gear 56 which is rotatably mounted on the main shaft 34 but can be selectively connected to the main shaft by means of a coupling member in the form of a conventional single-acting slidable clutch coupling sleeve 58, with which is associated a conventional synchroniser ring 60.

The selector mechanism 10 for selective establishment of gear ratios in the change-speed gear includes a selector shaft 62 which is mounted in an upper portion of the gear housing 20 for rotary movement about the longitudinal axis of the selector shaft, and for movement in the longitudinal direction of the selector shaft. For producing the rotary and longitudinal movements of the selector shaft 62, the gearshift lever 12 has a stirrup-joint connection to the selector shaft: specifically, a lower end portion of the gearshift lever is formed with a pair of generally disc-shaped legs 64 straddling a crank pin 66, between a spaced pair of flanges on the crank pin, the crank pin being fixed by way of a crank arm to one end of the selector shaft. As is best seen in FIGS. 3 to 5, outwardly offset extensions 68 of the legs 64 are, in a normal position of the gearshift lever, engageable with the selector shaft 62 to baulk rotary movement of the selector shaft into the outermost two of four possible positions; however, the gearshift lever 12 is mounted by means of a spring-loaded ball mounted 70 allowing the gearshift lever to be lifted against the bias of the spring, in the direction of the arrow in FIG. 4, into a position in which the arc of movement of the baulking extensions 68 is clear of the selector shaft, whereby rotary movement of the selector shaft 62 is possible into all four of its positions.

The selector shaft 62 includes a longitudinal blade-like lateral extension 72 having first and second selector portions 74 and 76 which are longitudinally spaced from each other and are constituted by corresponding pairs of shoulders arranged with the shoulders of each pair facing together to form a respective recess. A striker member 78 for the fourth and third gear ratios of the change-speed gear is in the form of a striker fork which has a hollow boss portion 80 slidably mounted on a striker shaft 82 that is mounted at one end in the first wall 16 of the gear casing 20 and extends parallel to the selector shaft 62; a fork portion of the striker member 78 co-operates with a circumferential groove in the third and fourth-ratio coupling sleeve 38, and a selector portion 84 of the striker member 78 is constituted by outwardly facing shoulders of a projection on the hollow boss portion 80. In a neutral position of the gearshift lever 12, as shown in FIG. 1, the selector portion 84 of the striker fork member 78 is in the same radial-plane region of the selector shaft 62 as the first selector portion 74 of the selector shaft extension 72.

In a similar manner, the first and second-ratio coupling sleeve 36 co-operates with a striker fork member 86 which is slidably mounted on the striker shaft 82 and has a projection the outwardly facing shoulders of which constitute a selector portion 88. In the neutral position of the gearshift lever 12, the selector portion 88 of the striker fork member 86 is in the same radial-plane region of the selector shaft 62 as the second selector portion 76 of the selector shaft extension 72.

As is shown in FIG. 2, the idler gearwheel 42 forming the coupling member of the reverse-ratio gear train cooperates with one end portion of a pivotally mounted striker lever 90; the other end portion of the reverse striker lever 90 constitutes a selector portion 92, which, in the neutral position of the gearshift lever 12, is in the same radial-plane region of the selector shaft 62 as the second selector portion 76 of the selector shaft extension 72.

The coupling sleeve 58 for the overdrive (fifth)-ratio gearset 54, 56 co-operates with a fork portion 94 of a striker member 96, the striker member also including a cantilever extension 98 which terminates in a selector portion 100. In the neutral position of the gearshift lever 12, this selector portion 100 of the striker fork member 96 is in the same radial-plane region of the selector shaft 62 as the second selector portion 76 of the selector shaft extension 72. The fork portion 94 and the cantilever extension 98 are fixed to opposite ends of a tube-like cylindrical hollow boss portion 102 of the striker fork member 96: the cylindrical hollow boss portion 102 is arranged as a slidable mounting on the striker shaft 82, and the external surface of the hollow boss portion extends through, and is slidable in, an aperture in the second wall 18 of the gear housing 20, such that the slidable striker fork member 96 itself forms a mounting support for the striker shaft 82 with respect to the second wall of the gear housing.

As is shown in FIG. 2, the selector portions 92, 88, 84 and 100 of the four striker members 90, 86, 78 and 96 respectively are circumferentially spaced round the selector shaft 62. As already mentioned, when the gearshift lever 12 is in its neutral position the selector portions 92, 88 and 100 are in the same radial-plane region of the selector shaft as the second selector portion 76 of the selector shaft extension 72, whereas the selector portion 84 is in the same radial-plane region of the selector shaft as the first selector portion 74 of the selector shaft extension 72, this longitudinally staggered arrangement being convenient in avoiding the need for a cantilever mounting for the selector portion 84.

The selector mechanism also includes and interlock member in the form of an interlock sleeve 104 which is rotatably mounted on the selector shaft 62 and is constrained from moving relative to the gear housing 20 in the longitudinal direction of the selector shaft by engagement with a pin (not shown) projecting from the housing. The interlock sleeve 104 is constructed and operates in substantially the same manner as is disclosed in the specification of U.S. Pat. 3,264,893 assigned to the present assignees: it is rotatable by the blade-like extension 72 of the selector shaft; it includes first and second circumferential grooves corresponding to the selector recesses of the blade-like extension of the selector shaft; and it includes a longitudinally extending slot flanked by blocker portions arranged to prevent longitudinal movement of the striker members other than the selected one.

The mode of operation of the selector mechanism should be largely apparent from the foregoing description. To engage a gear ratio, the gearshift lever 12 is first operated to produce rotary movement of the selector shaft 62 for bringing the selector portions 74 and 76 of the selector shaft into alignment with the selector portion of a selected one of the striker members, for example with the selector portion 100 of the striker fork member 96 in the rotary position shown in FIG. 2. The gearshift lever is subsequently operated to produce longitudinal movement of the selector shaft, thereby moving the selected striker member longitudinally with the respective selector portions 76 and 100 in engagement, for engagement of the overdrive ratio (in this example), the blocker portions of the longitudinally immovable interlock sleeve 104 preventing longitudinal movement of the other selector portions 92, 88 and 84. Engagement of the overdrive ratio, and engagement of reverse ratio, involve lifting the gearshift lever in opposition to the bias of its spring, since in the normal position of the gearshift lever the baulking extensions 68 engage the selector shaft to prevent engagement of the two outermost selector portions 92 and 100, corresponding to the reverse and overdrive ratios respectively, such that in this normal position of the gearshift lever only the two inner selector portions 88 and 84, corresponding to the first to fourth ratios, can be selected.

I claim:

1. In a change-speed gear, a selector mechanism having a housing having first and second walls; an aperture in said second wall, a plurality of coupling members with one located between said walls and another beyond said second wall; a striker shaft mounted on the first wall; a plurality of striker members slidably mounted on the striker shaft for selective movement for effecting movement of respective coupling members; the striker member for said another of the coupling members includes a hollow boss portion slidably mounted on the striker shaft for relative movement and support of the striker shaft, and said hollow boss portion extending through, and is slidably supported in, the aperture in the second wall, and forms a mounting support for the striker shaft with respect to said second wall.

2. The invention defined in claim 1 and underdrive gearing located between said walls and overdrive gearing located beyond said second wall; said another coupling member operatively connected to and controlling said overdrive gearing and the one coupling member operatively connected to and controlling said underdrive gearing.

3. In a change-speed gear, a selector mechanism having a housing having first and second walls; an aperture in said second wall; a plurality of coupling members for shifting the change-speed gear with one coupling member located between said walls and another coupling member located beyond said second wall, a selector shaft mounted in the housing for rotary movement about the longitudinal axis of the selector shaft and for movement in the longitudinal direction of the selector shaft; a striker shaft mounted at one end on the first wall; striker members slidably mounted on said striker shaft, and each cooperating with the respective coupling member and having a selector portion; the selector shaft includes at least one selector portion, operative on rotary movement of the selector shaft for alignment of the selector portion of the selector shaft with the selector portion of any selected one of the striker members, and subsequent longitudinal movement of the selector shaft moves the selected striker member longitudinally with the respective selector portions in engagement; and the striker member for the another coupling member includes a hollow boss portion slidably mounted on the striker shaft for slidably supporting the striker member on the striker shaft, and the said hollow boss portion extends through, and is slidable in, the aperture in the second wall and forms a mounting support for the striker shaft on the second wall.

4. In a change-speed gear, a selector mechanism having a housing having a projection, a first wall and a second wall having an aperture; ratio gearing between said walls having at least one coupling member for operating the ratio gearing, and overdrive gearing beyond said second wall having another coupling member for operating the overdrive gearing; a selector shaft mounted in the housing for rotary movement about the longitudinal axis of the selector shaft and for movement in the longitudinal direction of the selector shaft and having a selector portion; a striker shaft mounted at one end in the first wall of the housing and extending parallel to the selector shaft; a plurality of striker members slidably mounted on the striker shaft; the striker members cooperating with the respective coupling members; the striker member for the another coupling member including a hollow boss portion slidably mounted on the striker shaft, for slidably supporting another coupling member on the striker shaft and the said hollow boss portion extending through, and is slidable in, the aperture in the second wall of the housing, and the hollow boss portion forms a mounting support for the striker shaft on the second wall of the housing; the striker members include respective selector portions which are grouped closely together for engagement by the selector portion of the selector shaft, and rotary movement of the selector shaft selectively aligns the selector portion of the selector shaft with the selector portion of any selected one of the striker members, and subsequent longitudinal movement of the selector shaft moves the selected striker member longitudinally with the respective selector portions in engagement; and an interlock member is mounted on the selector shaft for rotary movement therewith but is constrained from moving in the longitudinal direction of the selector shaft by engagement with the projection extending from the housing, the interlock member including blocker portions arranged for selective cooperation with the selector portions of the striker members for blocking longitudinal movement of the striker members other than the selected one.

5. The invention defined in claim 4 and the selector shaft having a crank arm and a crank pin and a gearshift lever pivotally mounted for pivotal movement in a normal position and another position and having at a lower end a bifurcated portion providing a pair of leg portions straddling the crank pin and the leg portions having outwardly offset extensions, in the normal position of the gearshift lever, engage with the selector shaft to balk rotary movement of the selector shaft into respective ones of two outermost rotary positions of the selector shaft and in said another position do not engage the selector shaft.

References Cited

UNITED STATES PATENTS 3,264,893    8/1966    Stott et al. _____ 74—477

MILTON KAUFMAN, Primary Examiner

U.S. Cl. X.R.

74—476